US012209531B2

(12) United States Patent
Pugsley et al.

(10) Patent No.: US 12,209,531 B2
(45) Date of Patent: Jan. 28, 2025

(54) ISOLATION DEVICE WITH TWO OR MORE SPRINGS IN SERIES

(71) Applicant: Litens Automotive Partnership, Woodbridge (CA)

(72) Inventors: Kyle Pugsley, Woodbridge (CA); Frank Verriet, Woodbridge (CA); Maciej Zaczkowski, Freigericht (DE)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 100 days.

(21) Appl. No.: 17/609,732

(22) PCT Filed: May 8, 2020

(86) PCT No.: PCT/CA2020/050636
§ 371 (c)(1),
(2) Date: Nov. 8, 2021

(87) PCT Pub. No.: WO2020/223826
PCT Pub. Date: Nov. 12, 2020

(65) Prior Publication Data
US 2022/0213835 A1 Jul. 7, 2022

Related U.S. Application Data

(60) Provisional application No. 62/844,904, filed on May 8, 2019.

(51) Int. Cl.
*F02B 67/06* (2006.01)
*B60K 25/02* (2006.01)
(Continued)

(52) U.S. Cl.
CPC ............. *F02B 67/06* (2013.01); *F16H 55/36* (2013.01); *B60K 25/02* (2013.01);
(Continued)

(58) Field of Classification Search
CPC .......... F02B 67/06; F02B 67/04; F16H 55/36; F16H 7/18; F16H 2055/363;
(Continued)

(56) References Cited

U.S. PATENT DOCUMENTS

| 4,530,673 A | 7/1985 | LaMarche |
| 5,682,972 A | 11/1997 | Sasada |

(Continued)

FOREIGN PATENT DOCUMENTS

| DE | 102008015476 A1 | 10/2009 | |
| EP | 1793142 A1 * | 6/2007 | ............ F16F 15/134 |

(Continued)

OTHER PUBLICATIONS

Fenioux (EP 1793142 A1 ) English translation from EPO website (Year: 2007).*

(Continued)

*Primary Examiner* — Michael R Mansen
*Assistant Examiner* — Raveen J Dias
(74) *Attorney, Agent, or Firm* — Aird & McBurney LP

(57) ABSTRACT

In one aspect, there is provided an isolation device, which includes a hub, a pulley and at least one isolation spring arrangement including first and second springs in series. The first spring rate is higher than the second spring rate. Initially during torque transfer from the first one to a second one of the hub and the pulley, the entire first isolation spring is slid along a friction surface towards the second one of the hub and the pulley during compression of the second isolation spring thereby generating a first frictional damping torque. During torque transfer the other way, at least a portion of the first isolation spring remains stationary relative to the friction surface, such that the first frictional damping torque is greater than the second frictional damping torque.

20 Claims, 10 Drawing Sheets

(51) Int. Cl.
  *F16D 3/12* (2006.01)
  *F16D 41/20* (2006.01)
  *F16H 7/08* (2006.01)
  *F16H 55/36* (2006.01)
(52) U.S. Cl.
  CPC .......... *B60K 2025/022* (2013.01); *F16D 3/12* (2013.01); *F16D 41/206* (2013.01); *F16H 2007/0806* (2013.01); *F16H 2055/366* (2013.01)
(58) Field of Classification Search
  CPC ....... F16H 2055/366; F16H 2007/0806; F16H 7/12; F16H 7/1209; F16H 7/1245; F16D 3/12; F16D 41/206; B06K 25/02; B60K 25/02; B60K 2025/022; F16F 15/123; F16F 15/12306; F16F 15/12323; F16F 15/12326; F16F 15/12333; F16F 15/1234; F16F 15/12346; F16F 15/12338; F16F 15/134; F16F 15/13407; F16F 15/13438; F16F 15/13446; F16F 15/13461; F16F 15/13469; F16F 15/13484
  USPC .......................................................... 474/94
  See application file for complete search history.

(56) References Cited

U.S. PATENT DOCUMENTS

| | | | | |
|---|---|---|---|---|
| 6,575,838 | B2* | 6/2003 | Jackel | F16F 15/13484 192/205 |
| 7,343,832 | B2* | 3/2008 | Jaeckel | F16F 15/1343 74/573.12 |
| 7,955,178 | B2 | 6/2011 | Mu | |
| 8,313,385 | B2* | 11/2012 | Mundt | F16F 15/12366 464/68.8 |
| 8,789,670 | B2* | 7/2014 | Antchak | F16D 41/206 192/55.61 |
| 8,801,524 | B2* | 8/2014 | Takikawa | F16F 15/12366 464/67.1 |
| 9,163,713 | B2 | 10/2015 | Yoon | |
| 9,206,871 | B2 | 12/2015 | Phillips | |
| 9,441,681 | B2* | 9/2016 | Williams | F16D 13/76 |
| 9,726,253 | B2* | 8/2017 | Yoon | F16F 15/123 |
| 9,797,498 | B2* | 10/2017 | Starodoubov | F16H 55/36 |
| 9,702,430 | B2 | 11/2017 | Oh et al. | |
| 9,869,365 | B2* | 1/2018 | Tran | F16H 55/36 |
| 10,041,578 | B2* | 8/2018 | Dell | B60K 25/02 |
| 10,060,502 | B2* | 8/2018 | Boyes | F16F 15/12333 |
| 10,125,856 | B2* | 11/2018 | Dell | F16D 3/66 |
| 10,267,405 | B2* | 4/2019 | Dell | B60K 25/02 |
| 10,690,228 | B2* | 6/2020 | Starodoubov | F16H 7/18 |
| 10,753,453 | B2* | 8/2020 | Cariccia | F16F 15/123 |
| 10,781,907 | B2* | 9/2020 | Cariccia | F16H 55/36 |
| 10,823,232 | B2* | 11/2020 | Dell | F16F 15/16 |
| 11,585,390 | B2* | 2/2023 | Cariccia | F02B 67/06 |
| 2004/0182196 | A1* | 9/2004 | Jaeckel | F16F 15/1343 464/68.92 |
| 2007/0037644 | A1* | 2/2007 | Mevissen | F16F 15/123 474/70 |
| 2008/0139351 | A1* | 6/2008 | Pflug | F16F 15/123 474/94 |
| 2008/0312014 | A1* | 12/2008 | Stief | F16F 15/123 474/94 |
| 2009/0121401 | A1* | 5/2009 | Lehmann | F16H 55/36 267/215 |
| 2011/0315502 | A1* | 12/2011 | Antchak | F16D 43/24 192/75 |
| 2012/0208646 | A1* | 8/2012 | Takikawa | F16H 45/02 464/68.8 |
| 2013/0098733 | A1* | 4/2013 | Antchak | B60K 25/00 192/41 S |
| 2013/0284139 | A1* | 10/2013 | Staley | F16F 15/1442 474/94 |
| 2014/0162794 | A1* | 6/2014 | Phillips | F16F 1/042 267/180 |
| 2014/0209428 | A1* | 7/2014 | Dell | F16F 15/1232 192/89.26 |
| 2015/0072813 | A1* | 3/2015 | Yoon | F16H 55/36 474/94 |
| 2015/0075943 | A1* | 3/2015 | Williams | F16D 13/08 192/41 S |
| 2015/0260233 | A1* | 9/2015 | Boyes | F16F 15/12333 474/94 |
| 2015/0316138 | A1* | 11/2015 | Dell | F16H 55/36 474/94 |
| 2016/0010697 | A1* | 1/2016 | Hennebelle | F16F 15/12306 464/68.8 |
| 2016/0091048 | A1* | 3/2016 | Tran | F16F 15/12373 474/94 |
| 2016/0123453 | A1* | 5/2016 | Starodoubov | F16H 7/18 474/94 |
| 2016/0138699 | A1* | 5/2016 | Dell | F16F 15/123 267/168 |
| 2016/0146328 | A1* | 5/2016 | Dell | B60K 25/02 474/94 |
| 2016/0153519 | A1* | 6/2016 | Yoon | F16H 7/02 474/94 |
| 2016/0201757 | A1* | 7/2016 | Tran | F02N 11/04 474/94 |
| 2016/0265643 | A1* | 9/2016 | Dell | F16F 15/12366 |
| 2016/0298703 | A1* | 10/2016 | Williams | F16D 27/02 |
| 2017/0023093 | A1* | 1/2017 | Lebas | F16F 15/12373 |
| 2017/0370444 | A1* | 12/2017 | Antchak | F16F 15/12373 |
| 2018/0045288 | A1* | 2/2018 | Cariccia | F16H 55/36 |
| 2018/0045289 | A1* | 2/2018 | Starodoubov | F16F 15/121 |
| 2018/0051792 | A1* | 2/2018 | Cariccia | F16F 15/123 |
| 2018/0087584 | A1* | 3/2018 | Al-Kattan | F16D 41/07 |
| 2018/0087599 | A1 | 3/2018 | Replete | |
| 2018/0163788 | A1* | 6/2018 | Dell | F16H 55/36 |
| 2020/0141451 | A1* | 5/2020 | Cariccia | F16D 3/12 |
| 2020/0208728 | A1* | 7/2020 | Cariccia | F16F 15/1234 |
| 2021/0324937 | A1* | 10/2021 | Kieran | F16D 3/12 |
| 2022/0196079 | A1* | 6/2022 | Sillmann | F16F 15/1215 |
| 2022/0290735 | A1* | 9/2022 | Hodgson | F16H 55/36 |
| 2022/0299099 | A1* | 9/2022 | Anwer | F02B 67/06 |
| 2023/0167883 | A1* | 6/2023 | Cariccia | F16D 27/118 180/65.21 |
| 2024/0240705 | A1* | 7/2024 | Cariccia | F16H 55/36 |
| 2024/0255046 | A1* | 8/2024 | Cariccia | F16H 55/36 |
| 2024/0288057 | A1* | 8/2024 | Cariccia | F16H 55/36 |

FOREIGN PATENT DOCUMENTS

| | | |
|---|---|---|
| JP | 2009150471 A | 7/2009 |
| WO | 2018132925 A1 | 7/2018 |
| WO | 2018154509 A1 | 8/2018 |

OTHER PUBLICATIONS

PCT/CA2020/050636, International Search Report and Written Opinion, Jul. 6, 2020, Canadian Intellectual Property Office.
English translation of EP 1793142.
English translation of DE102008015476.
English translation of JP2009150471.

* cited by examiner

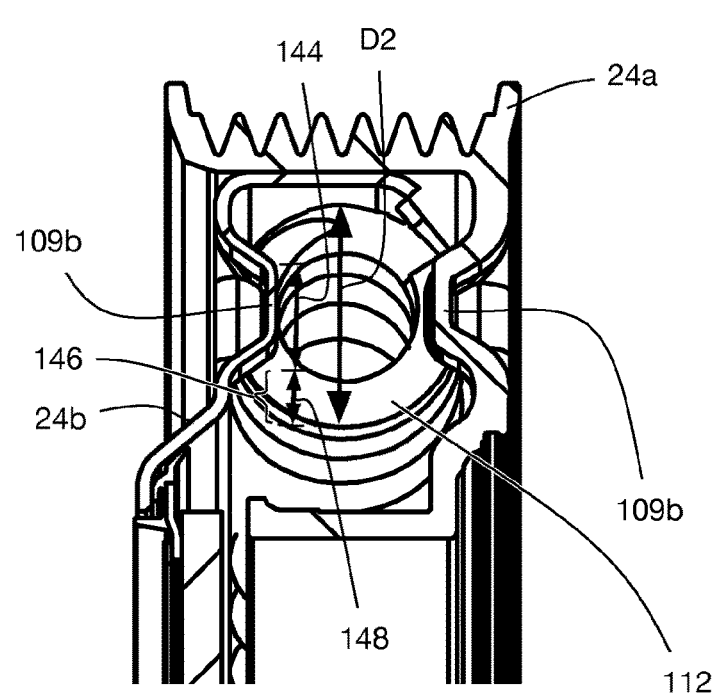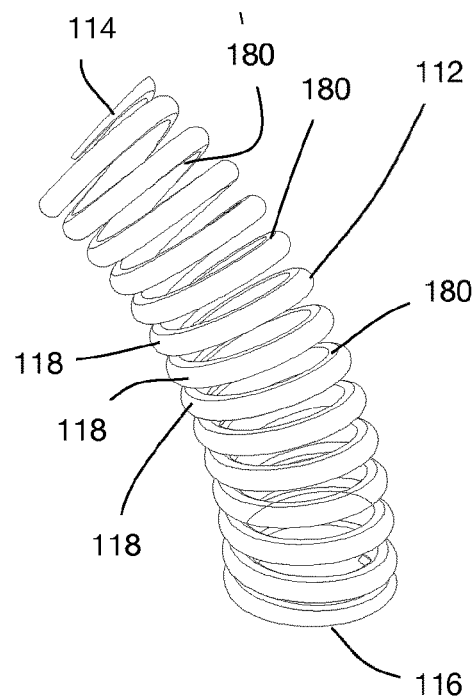
FIG. 12
FIG. 13
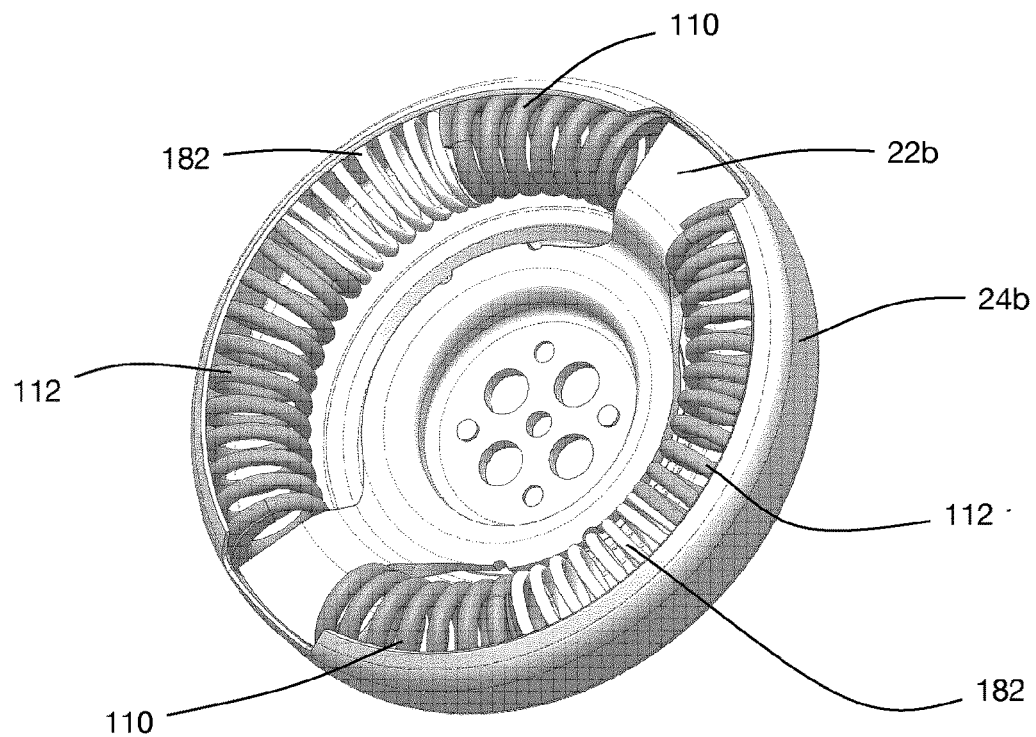
FIG. 14

ISOLATION DEVICE WITH TWO OR MORE SPRINGS IN SERIES

CROSS-REFERENCE TO RELATED APPLICATIONS

This application is a national phase entry of PCT/CA2020/050636 filed May 8, 2020, which claims the benefit of U.S. provisional application No. 62/844,904, filed May 8, 2019, the contents of both of which are incorporated herein by reference in their entirety.

FIELD

The specification relates generally to isolation devices for use on accessory drives for engines, and in particular for use on accessory drives for hybrid engines that incorporate a motor-generator unit (MGU) or similar device.

BACKGROUND OF THE DISCLOSURE

For engines, and in particular vehicular engines, an isolator is typically provided on the accessory drive so as to reduce the natural frequency of the external torque load driven by the crankshaft of the engine to be below the peak input torque frequency over a selected range of operating conditions for the engine. In some isolators, in addition to providing one or more springs there is frictional damping that is provided, which inhibits the isolator from going into resonance. Damping can be effective for this purpose, however, it is important not to provide too much damping, since this can negatively affect the performance of the isolator is primary function of reducing the natural frequency of the external torque load.

However, in some situations, it would be advantageous for the isolator to have a greater amount of damping. It would therefore be advantageous to provide an isolator that has an increased amount of damping in certain situations, but without having to have the increased amount of damping at all times.

Separately, it is generally desirable for the isolator to have as much travel as possible, in some situations, while having a reduced or at least not needing a large amount of travel in other situations.

SUMMARY OF THE DISCLOSURE

In one aspect, there is provided an isolation device, which includes a hub, a pulley and at least one isolation spring arrangement. The hub is mountable to a shaft. The pulley is rotatably mounted to the hub. The at least one isolation spring arrangement includes a first isolation spring and a second isolation spring. Each of the first and second isolation springs is a helical compression spring having a length. The first isolation spring has a first spring rate. The second isolation has a second spring rate and is positioned in series with the first isolation spring. The first spring rate is higher than the second spring rate. The first and second isolation springs are arranged such that the first isolation spring transfers torque from the second isolation spring into a first one of the hub and the pulley and the second isolation spring transfers torque from the first isolation spring into a second one of the hub and the pulley. Initially during torque transfer from the first one of the hub and the pulley to the second one of the hub and the pulley, the entire first isolation spring is slid along a friction surface towards the second one of the hub and the pulley by the first one of the hub and the pulley during compression of the second isolation spring thereby generating a first frictional damping torque. Initially during torque transfer from the second one of the hub and the pulley to the first one of the hub and the pulley, at least a portion of the first isolation spring remains stationary relative to the friction surface and the entire second isolation spring is slid along the friction surface, during compression of the first isolation spring by the second one of the hub and the pulley, thereby generating a second frictional damping torque. The first and second spring rates and the lengths of the first and second isolation springs are selected such that the first frictional damping torque is greater than the second frictional damping torque.

In another aspect, there is provided an isolation device, which includes a hub, a pulley and at least one isolation spring arrangement. The hub is mountable to a shaft. The pulley is rotatably mounted to the hub. The at least one isolation spring arrangement includes a first isolation spring and a second isolation spring. Each of the first and second isolation springs is a helical compression spring having a first end, a second end, and a plurality of coils between the first and second ends. The first ends of the first and second isolation springs face away from one another, and the second ends of the first and second isolation springs face one another. The first and second isolation springs each have a diameter, and extend along an arcuate path inside the pulley about an isolation device axis. The first isolation spring has a first spring rate, and wherein the second isolation has a second spring rate and is positioned in series with the first isolation spring, wherein the first spring rate is higher than the second spring rate. The first and second isolation springs are arranged such that the first isolation spring transfers torque from the second isolation spring into a first one of the hub and the pulley and the second isolation spring transfers torque from the first isolation spring into a second one of the hub and the pulley. A first spring drive surface on the first one of the hub and the pulley engages the first end of the first isolation spring, and a second spring drive surface on the second one of the hub and the pulley engages the first end of the second isolation spring. The second spring drive surface extends across a first portion of the diameter of the second isolation spring such that there is a space adjacent the second spring drive surface towards the isolation device axis. The space extends across a second portion of the diameter of the second isolation spring, from a side edge of the second spring drive surface to a radially inner edge of the second isolator spring relative to the isolation device axis. During torque transfer from the first one of the hub and the pulley to the second one of the hub and the pulley, the at least one isolation spring arrangement permits relative movement between the hub and the pulley through a first range of angular movement, and wherein, during torque transfer from the second one of the hub and the pulley to the first one of the hub and the pulley, the at least one isolation spring arrangement permits relative movement between the hub and the pulley through a second range of angular movement. The second spring rate and a size of the space are selected such that, at a selected torque transfer level during torque transfer between the hub and the pulley through the first and second isolation springs, the selected torque transfer level drives the coils of the second isolation spring to contact one another on the radially inner side of the second isolation spring relative to the isolation device axis, which in turn drives at least one of the coils at the free end of the second isolation spring to tip into the space, which in turn permits the first range of angular movement to exceed the second range of angular movement.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which:

FIG. 12 is a sectional view of a portion of the isolation device shown in FIG. 2.

FIG. 13 is a magnified view of one of the isolation springs in the isolation spring arrangement of the isolation device shown in FIG. 2, with an optional flattening of certain surfaces thereof.

FIG. 14 is a perspective view of a variant of the isolation device shown in FIG. 2, where each isolation spring arrangement includes first, second and third isolation springs all in series with one another.

Figure 1:
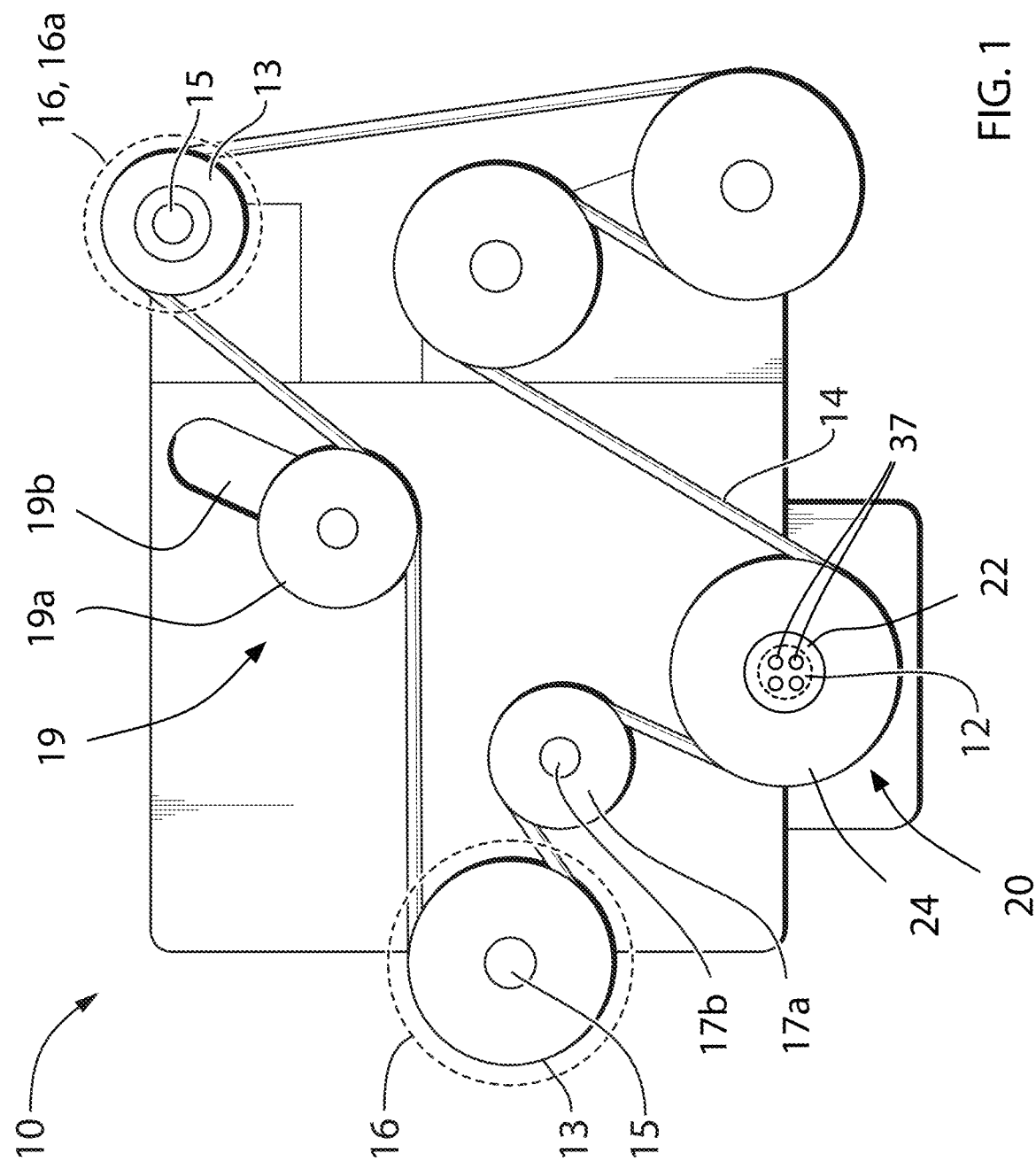
FIG. 1 is an elevation view of an engine with an isolation device in accordance with an embodiment of the present disclosure.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as a motor/generator unit (MGU) and an air conditioning compressor. Each accessory 16 includes an accessory shaft 15 with a pulley 13 thereon, which is driven by the belt 14. Additionally, shown in the present embodiment is an idler pulley shown at 17a on an idler shaft 17b, and a tensioner pulley 19a rotatably mounted on a tensioner arm 19b, which form part of a belt tensioner 19. The functions of the idler pulley 17a and the belt tensioner 19 are well known to one of skill in the art.

An isolation device 20 may be provided instead of a pulley, in one or more places to control torque transfer between the crankshaft 12 and the accessory shafts 15. In FIG. 1, the isolation device 20 is provided on the crankshaft 12. The isolation device 20 transfers torque between the crankshaft 12 and the belt 14, but attenuates torsional vibrations from the crankshaft 12 from being transmitted to the belt 14. Such torsional vibrations, oscillations in the speed of the crankshaft 12, are inherent to internal combustion piston engines. These oscillations are isolated from the belt 14 by the isolation device 20, and as a result, the stresses that would otherwise be incurred by the belt 14 and by the accessory shafts 15 are reduced.

Figure 2:
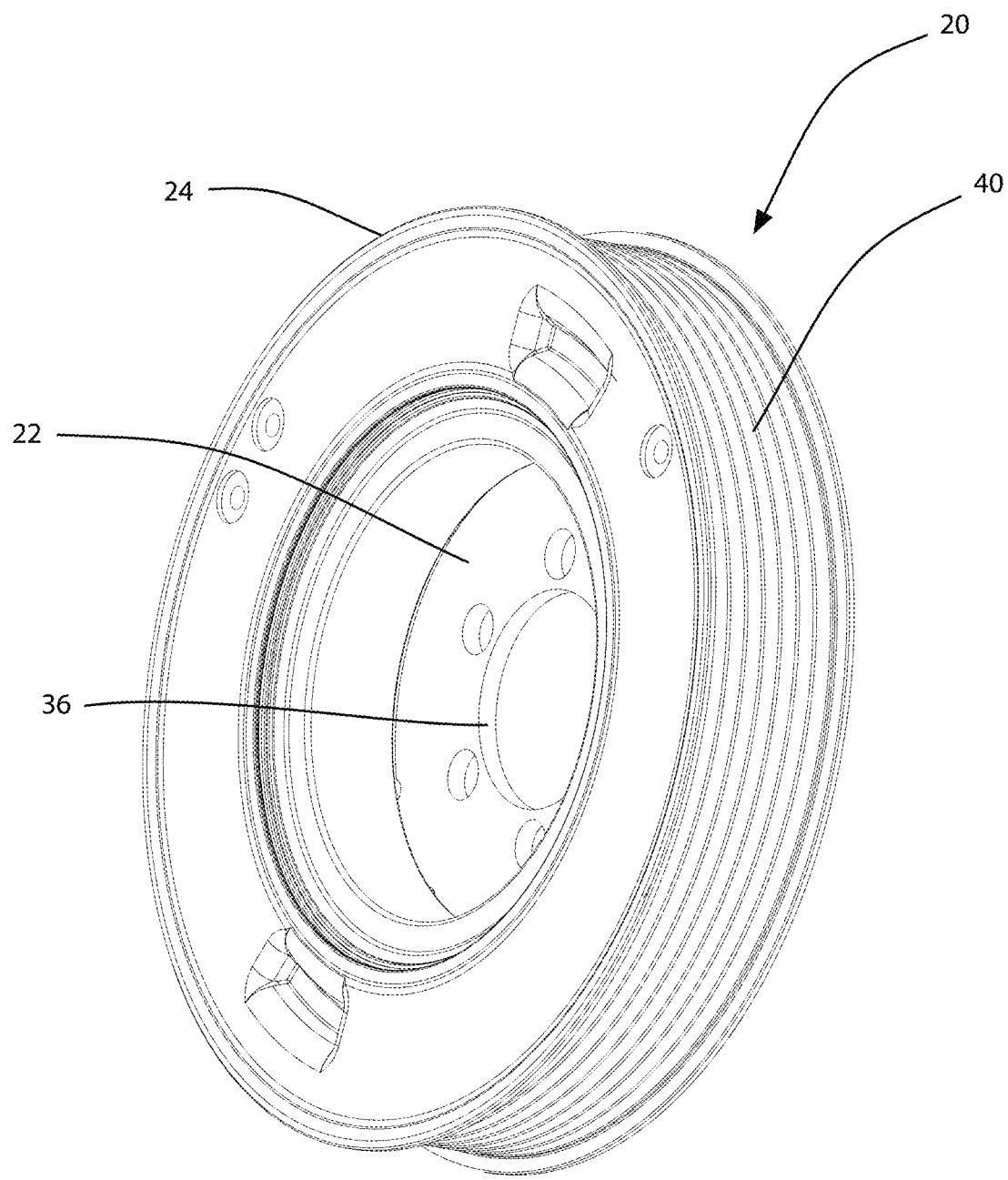
FIG. 2 is a perspective view of the isolation device shown in FIG. 1.
Figure 3:
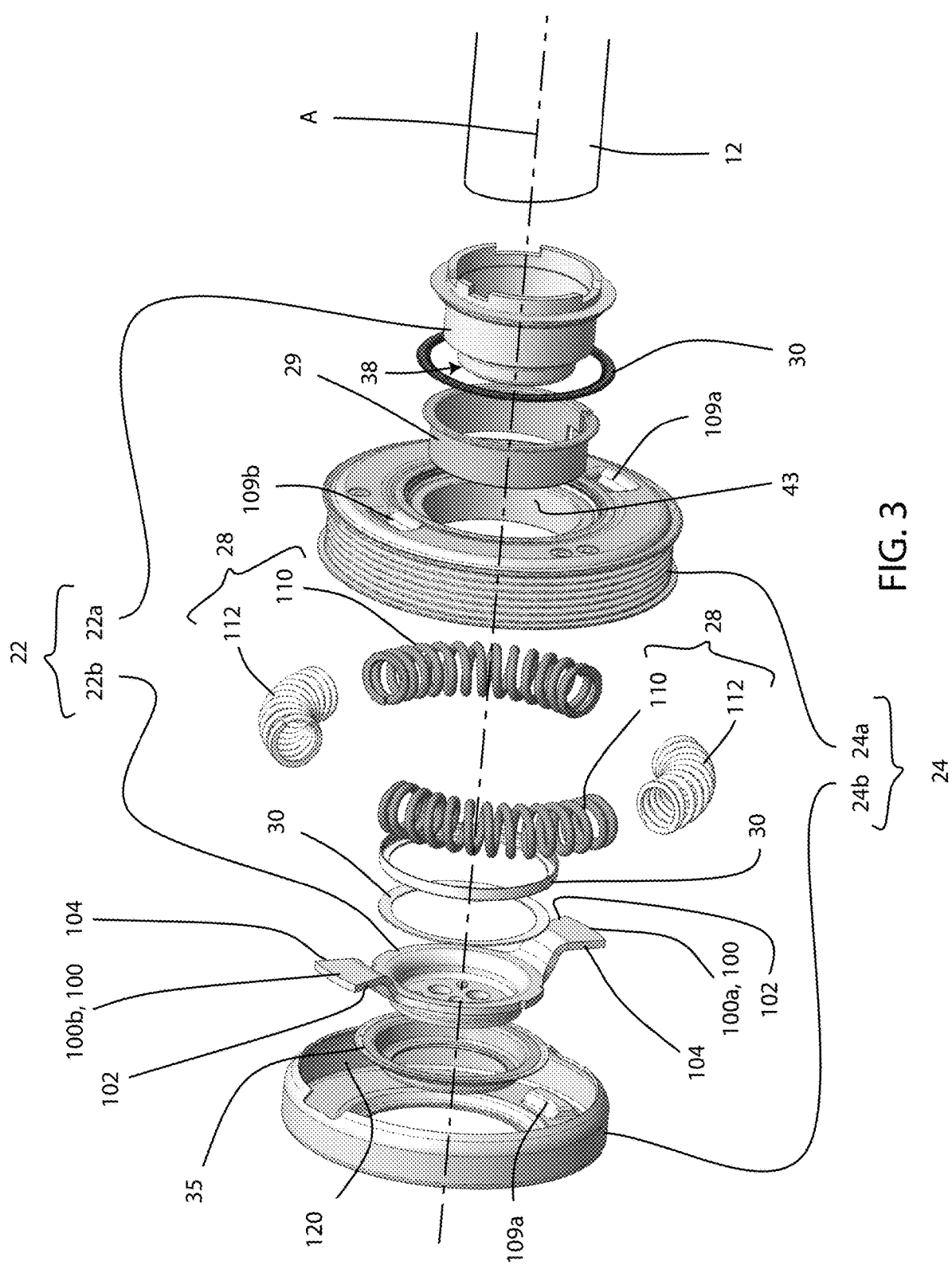
FIG. 3 is a perspective exploded view of the isolation device shown in FIG. 2.

Reference is made to FIGS. 2 and 3, which show a perspective assembled view, and a perspective exploded view of the isolation device 20, respectively. The isolation device 20 includes a hub 22, a pulley 24, first and isolation spring arrangements, each shown at 28. In the example shown in FIGS. 2 and 3, the isolation device 20 further includes optional elements including a bushing 29, seals 30 and a thrust plate 35.

The hub 22 includes a shaft adapter 22a and a driver 22b in the embodiment shown. The shaft adapter 22a is adapted to mount to the crankshaft 12 in any suitable way. For example, the shaft adapter 22 may have a shaft-mounting aperture 36 therethrough that defines a rotational axis A for the isolation device 20. The shaft mounting aperture 36 may be configured to snugly receive the end of the crankshaft 12. A plurality of shaft-mounting fasteners 37, such as bolts, (FIG. 1) may be inserted through a distal end 38 of the shaft adapter 22a and the driver 22b to fixedly mount them to the crankshaft 12 so that the hub 22 and the crankshaft 12 co-rotate together about the axis A.

The driver 22b includes first and second drive arms 100, individually shown at 100a and 100b. Each drive arm 100 has a first hub/spring interface surface 102 and a second hub/spring interface surface 104. The first and second hub/spring interface surfaces 102 and 104 are positioned to engage ends of the isolation spring arrangements 28 as described further below.

The pulley 24 is rotatably coupled to the shaft adapter 22. The pulley 24 has an outer surface which includes a belt engagement surface 40 that is configured to engage the belt 14 (FIG. 1). The belt 14 may thus be a multiple-V belt.

The pulley 24 may be formed from a main pulley portion 24a that includes the belt engagement surface 40 thereon, and a pulley cover 24b that cooperates with the main pulley portion 24a to define a spring shell 42, for holding the first and second isolation spring arrangements 28.

The pulley 24 further includes an inner surface 43. The bushing 27 engages the inner surface 43 of the pulley 24 and rotatably supports the pulley 24 on the shaft adapter 22a. The bushing 27 may be a polymeric member that has a selected, low friction coefficient. Suitable materials for the bushing 27 include, for example, certain forms of nylon.

The pulley 24 includes two pairs of lugs that are formed by pressing in the material of the main pulley portion 24a and the pulley cover 24b inwardly. A first pair of lugs 109a is shown in FIG. 3. The second pair of lugs 109b is shown in FIG. 12. The first pair of lugs 109a face one another, and the second pair of lugs 109b face one another. The pulley 24 includes first and second pulley/spring interface surfaces 106 and 108, which are positioned to engage ends of the isolation spring arrangements 28, as described further below. In the embodiment shown, the first pulley/spring interface surfaces 106 are provided on a first side of the lugs 109a and 109b, and the second pulley/spring interface surfaces 108 are provided on a second side of the lugs 109a and 109b.

The isolation spring arrangements 28 are provided to accommodate oscillations in the speed of the crankshaft 12 in relation to the belt 14, as noted above. The isolation spring arrangements 28 may each include a first isolation spring 110 and a second isolation spring 112. Each of the first and second isolation springs 110 and 112 (FIG. 5) is a helical compression spring, and preferably extends along an arcuate path inside the pulley 24. Each of the first and second isolation springs 110 and 112 has a first end 114, a second end 116, and a plurality of coils 118 between the first and second ends 114 and 116. The first ends 114 of the first and second isolation springs 110 and 112 face away from one another, and the second ends 116 of the first and second isolation springs 110 and 112 face one another. The first and second isolation springs 110 and 112 a length L1 and L2 (FIG. 5), respectively, and a diameter D1 and D2 (FIG. 5), respectively. The first and second isolation springs 110 and 112 have respective first and second spring rates K1 and K2. In the embodiment shown, the diameters D1 and D2 are approximately equal, though they do not need to be strictly equal. In the embodiment shown, the length L1 is greater than the length L2, though this need not be true in all embodiments. In the embodiment shown, the first spring rate K1 is greater than the second spring rate K2, though this need not be true in all embodiments.

The first and second isolation springs 110 and 112 are arranged in series with one another, such that the first isolation spring 110 transfers torque from the second isolation spring 112 into a first one of the hub 22 and the pulley 24 and the second isolation spring 112 transfers torque from the first isolation spring 110 into a second one of the hub 22 and the pulley 24. In the example shown in FIG. 6, the first one of the hub 22 and the pulley 24 is the hub 22 and the second one of the hub 22 and the pulley 24 is the pulley 24. As can be seen in this example, the first end 114 of the second isolation spring 112 remains fixed rotationally relative to the pulley 24, while the driver 22b engages the first end 114 of the first isolation spring 110.

Because the first spring rate K1 is higher than the second spring rate K2, what occurs initially during torque transfer from the first one of the hub 22 and the pulley 24 to the second one of the hub 22 and the pulley 24, is that the entire first isolation spring 110 is slid along a friction surface 120 (which in this instance is a surface of the pulley cover 24b) towards the second one of the hub 22 and the pulley 24 by the first one of the hub 22 and the pulley 24 during compression of the second isolation spring 112 thereby generating a first frictional damping torque TF1. This damping torque can be seen in the torque/displacement curve shown at 200 in FIG. 8. This damping torque TF1 arises from friction generated by the movement of the first isolation spring 110 along the friction surface 120, and by the movement of a portion of the second isolation spring 112 along the friction surface 120. Only a portion of the second isolation spring 112 moves, or moves significantly, along the friction surface 120 in this example, since the first end 114 of the second isolation spring 112 is engaged with the second pulley/spring interface surface 108.

During this initial range of torque transfer (shown at 202 in FIG. 8), the effective spring rate of the isolation spring arrangement 28 is equal to $1/(1/K1+1/K2)$. Once the torque transfer through the first and second isolation springs 110 and 112 reaches a first selected torque transfer level TS1 (FIG. 8), the first isolation spring 110 is fully compressed, at which point only the second isolation spring 112 continues to be compressed, which defines a second range of torque transfer. In this second period of torque transfer, the effective spring rate of the isolation spring arrangement 28 is only the spring rate K2, since the first spring is effectively a solid member, having been compressed fully. This second range of torque transfer is shown at 204 in FIG. 8.

Figure 7:
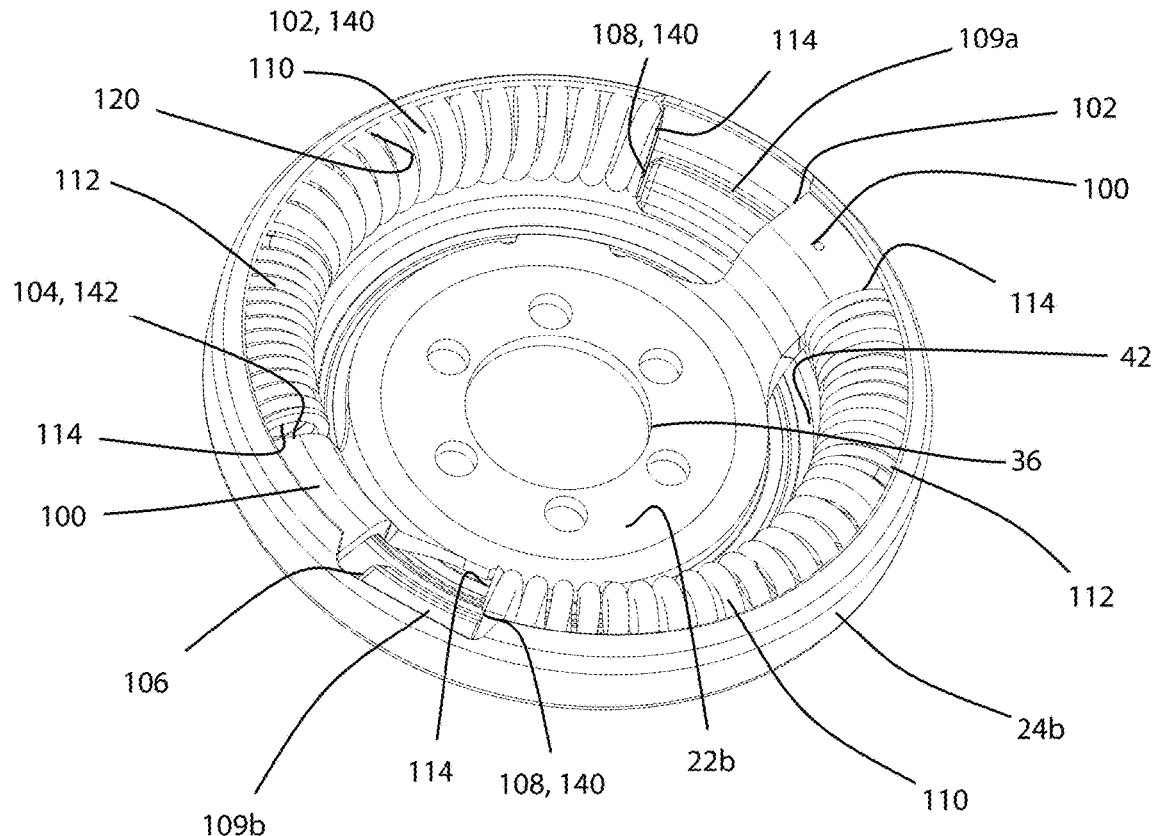
FIG. 7 is a perspective view of a portion of the isolation device shown in FIG. 1, showing torque transfer from a pulley of the isolation device to a hub of the isolation device.

By contrast, FIG. 7 (and the torque curve 250 in FIG. 8) illustrate torque transfer from the second one of the hub 22 and the pulley 24 to the first one of the hub 22 and the pulley 24. As can be seen, the first end 114 of the second isolation spring 112 is engaged with the first pulley/spring interface surface 106. As a result, initially a portion of the second isolation spring 112 remains stationary relative to the friction surface 120 and the entire second isolation spring 112 is slid along the friction surface 120 during compression of the first isolation spring 110 by the second one of the hub 22 and the pulley 24, thereby generating a second frictional damping torque TF2 (FIG. 8).

The first and second spring rates K1 and K2 and the lengths L1 and L2 of the first and second isolation springs 110 and 112 impact the first and second frictional damping torques TF1 and TF2, and may be selected such that the first frictional damping torque TF1 is greater than the second frictional damping torque TF2. The size of the difference between the first and second frictional damping torques TF1 and TF2 depends at least in part on such factors as the particular lengths selected for L1 and L2 and the particular spring rates selected for K1 and K2.

Figure 8:
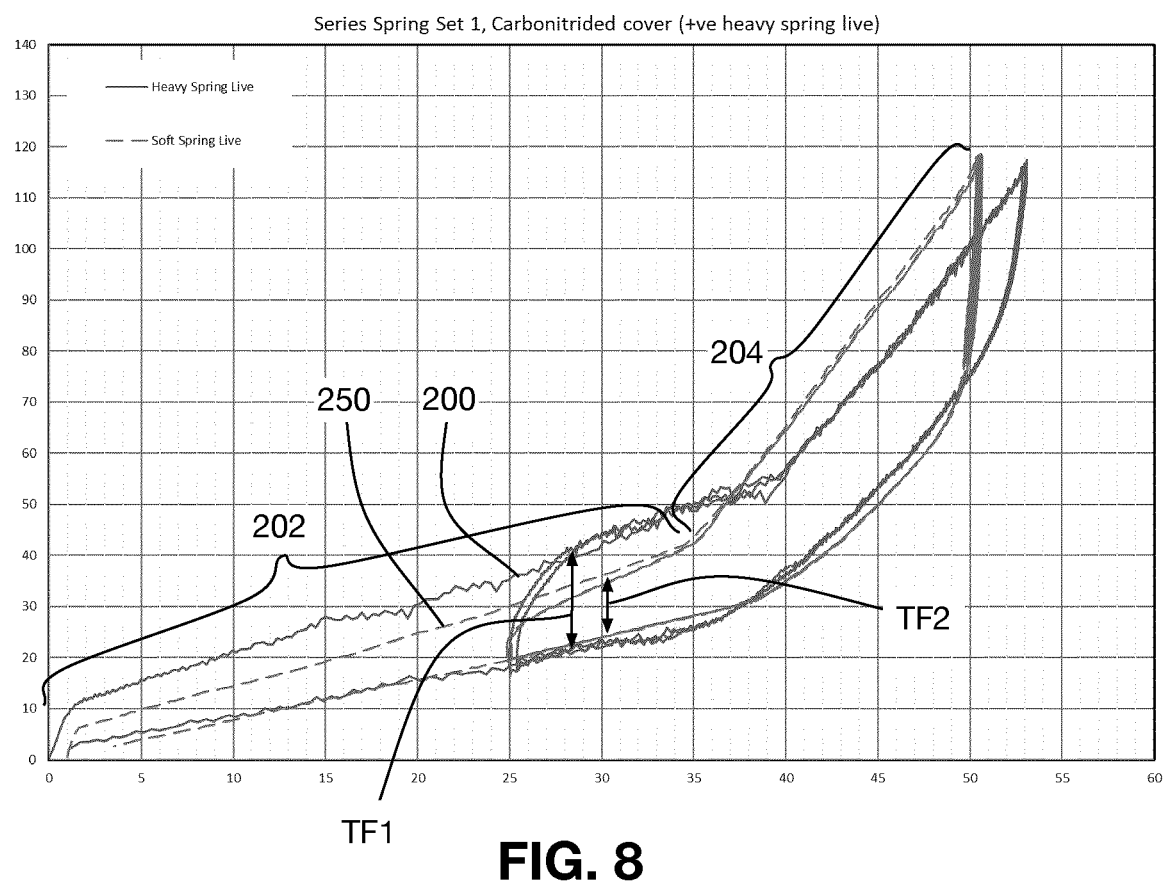
FIG. 8 is a graph illustrating torque output from the isolation device shown in FIG. 1 on a test machine simulating an engine.

Also, in the example shown in FIG. 7, relating to curve 250 in FIG. 8, once the torque transfer through the first and second isolation springs 110 and 112 reaches a second selected torque transfer level TS2 (FIG. 8), the first isolation spring 110 is again fully compressed, at which point only the second isolation spring 112 continues to be further compressed, which defines a second range of torque transfer. As can be seen, because of the increased amount of damping torque that is present initially during torque transfer from the first one of the hub 22 and the pulley 24 to the second one of the hub 22 and the pulley 24 relative to initially during transfer from the second one of the hub 22 and the pulley 24 to the first one of the hub 22 and the pulley 24, the first selected torque transfer level TS1 at which the first isolation spring 110 is fully compressed and the isolation spring arrangement 28 enters the second range of torque transfer is higher than the second selected torque transfer level TS2 at which the first isolation spring 110 is fully compressed and the isolation spring arrangement 28 enters the second range of torque transfer.

Figures 4, 5:
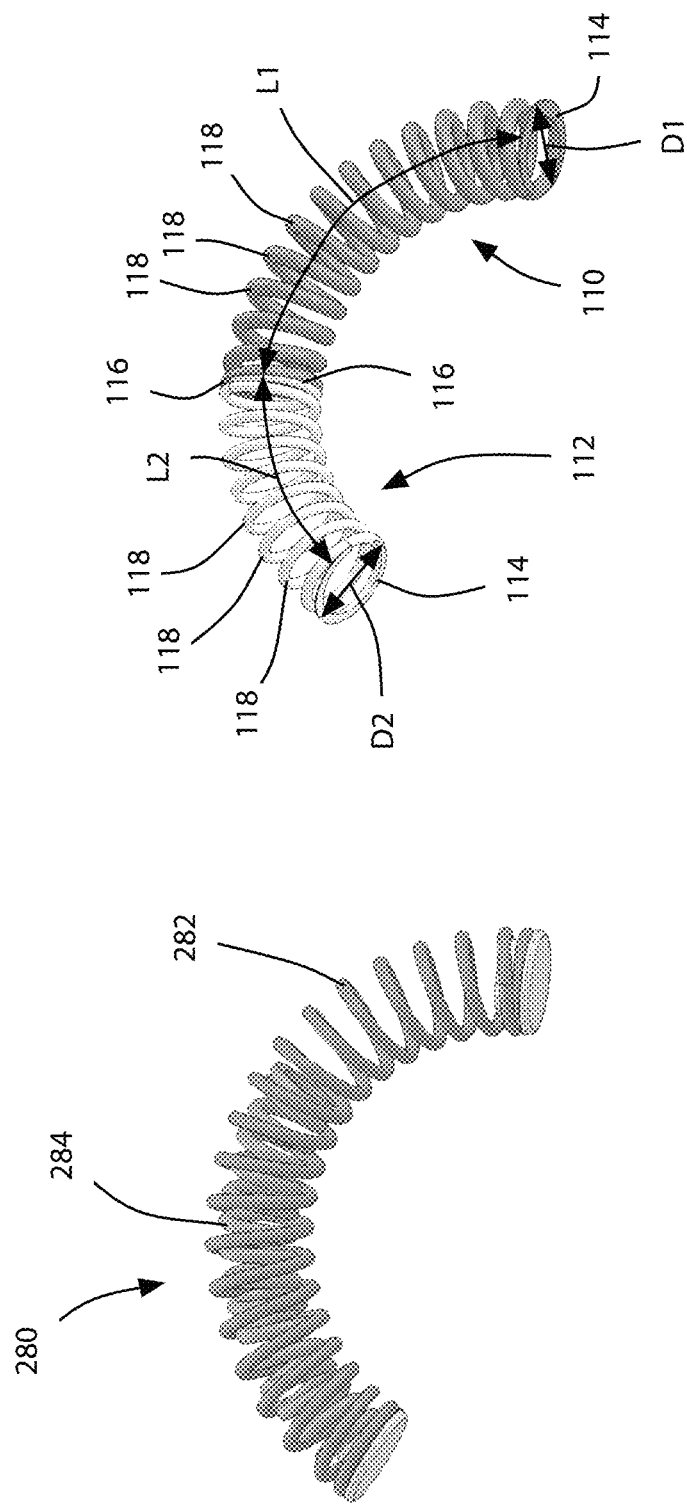
FIG. 4 is an isolation spring arrangement from a prior art isolation device.
FIG. 5 is isolation spring arrangement from the isolation device shown in FIG. 2.
Figure 9:
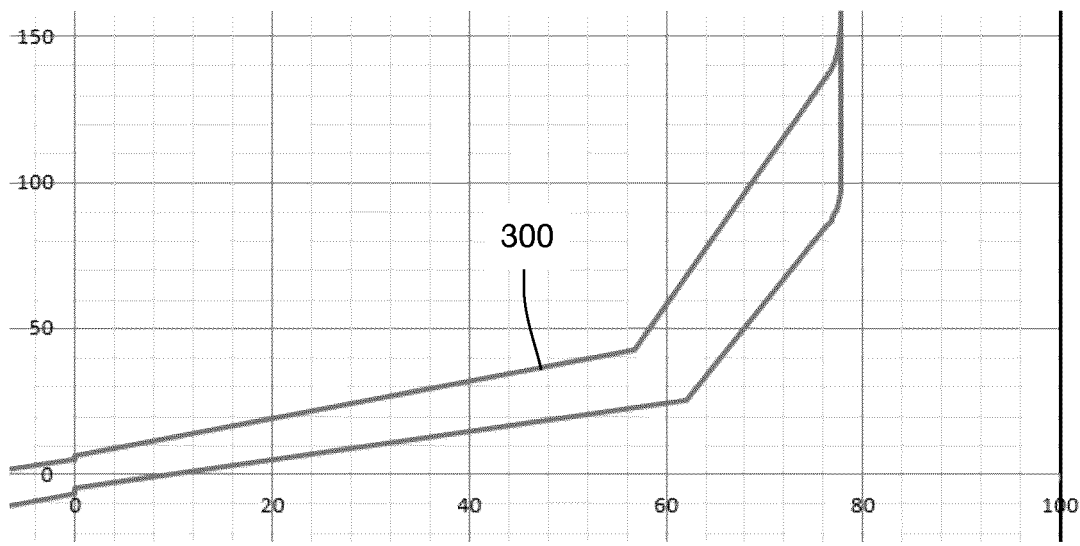
FIG. 9 is a graph illustrating torque output from an isolation device of the prior art.

By contrast, an isolation spring arrangement of the prior art is shown at 280 in FIG. 4 and has a torque curve that is shown at 300 in FIG. 9. The torque curve 300 shown in FIG. 9 is mathematically derived, and thus appears much cleaner than the torque curves shown in FIG. 8, which were derived from a simulated engine. The isolation spring arrangement 280 shown in FIG. 4 includes first and second isolation springs 282 and 284 which are nested (i.e. such that the second isolation spring 284 is nested within and is shorter than, the first isolation spring 282). With springs that are nested, the amount of frictional damping that is provided is more or less solely dependent on friction between the outer spring (i.e. the first isolation spring 282), and the friction surface (not shown) against which it rubs. Accordingly, there is essentially no difference in the amount of damping torque regardless of whether the hub of such an isolator would transfer torque to the pulley, or whether the pulley would transfer torque to the hub. Thus the curve 300 is representative of the torque transfer both ways, (i.e. regardless of which end of the isolation spring assembly 280 is being moving relative to the friction surface against which the isolation spring arrangement 280 slides).

These properties of the isolation device 20 described herein, may be advantageous in a number of situations or applications. For example, in a situation in which the engine 10 is equipped with the MGU 16a, the engine 10 may have two modes of starting, including a first start mode (referred to as a key start) in which the engine 10 is started via a starter motor engaged with the flywheel until combustion takes over, and a second start mode (referred to as an MGU start) in which the MGU drives the crankshaft 12 via the belt 14 until combustion takes over. During a key start, it may be desirable to have a relatively high amount of friction in the initial range of torque transfer through the isolation device 20, and it may be desirable to move the torque at which the isolation spring arrangement 28 enters the second range of torque transfer to be as late as possible. This inhibits the isolation device 20 from cycling between the first ranges and second ranges of torque transfer. During an MGU start, however, there may be less need for frictional damping for certain reasons. For example, during an MGU start there is a lower likelihood of resonance from occurring.

Figure 11A:
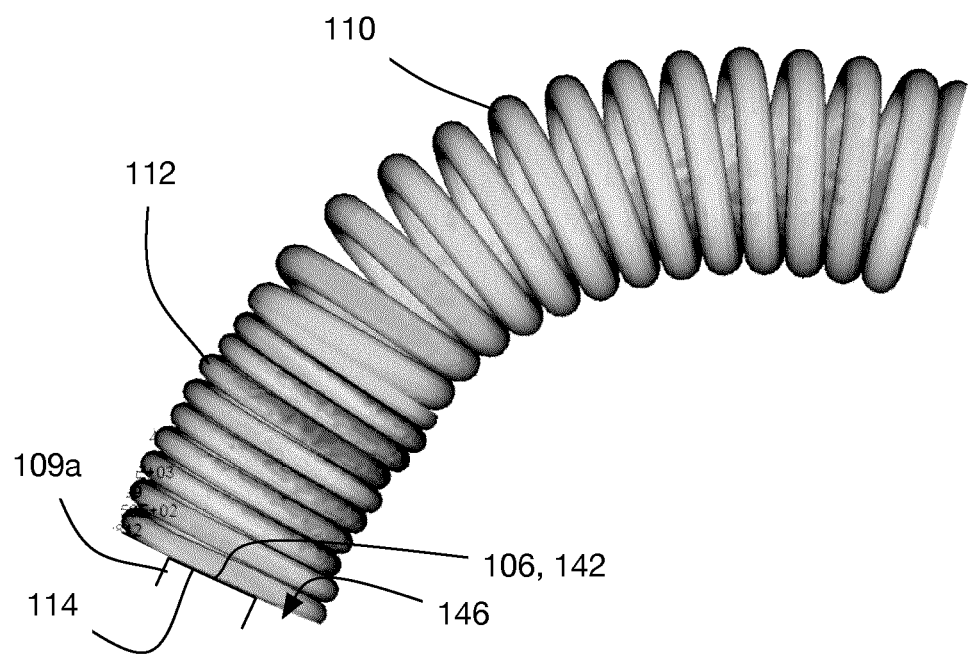
FIG. 11A is a magnified plan view of the isolation spring arrangement immediately prior to tipping of coils from one of the isolation springs in the isolation spring arrangement.
Figure 11B:
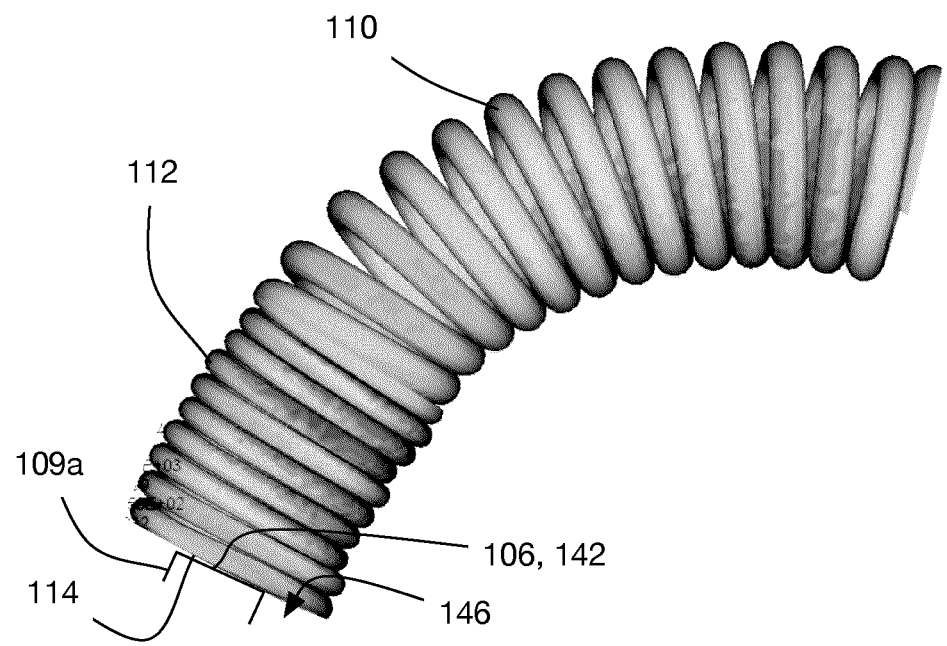
FIG. 11B is a magnified plan view of the isolation spring arrangement immediately after tipping of coils from one of the isolation springs in the isolation spring arrangement.

Another feature of the isolation device 20 is illustrated in FIGS. 11 and 12, and relates to the hub/spring interface surfaces 102 and 104 and in particular the pulley/spring interface surfaces 106 and 108. For the purposes of discussing this feature, whichever of the hub/spring interface surfaces 102 and 104 or the pulley/spring interface surfaces 106 and 108 is engaged with the first end 114 of the first isolation spring 110 will be referred to as a first spring drive surface 140, and whichever of the hub/spring interface surfaces 102 and 104 or the pulley/spring interface surfaces 106 and 108 is engaged with the first end 114 of the second isolation spring 112 will be referred to as a second spring drive surface 142. In the example situation shown in FIG. 6, the first spring drive surfaces 140 are the first hub/spring interface surfaces 104, and the second spring drive surfaces 142 are the first pulley/spring interface surfaces 106.

Figure 6:
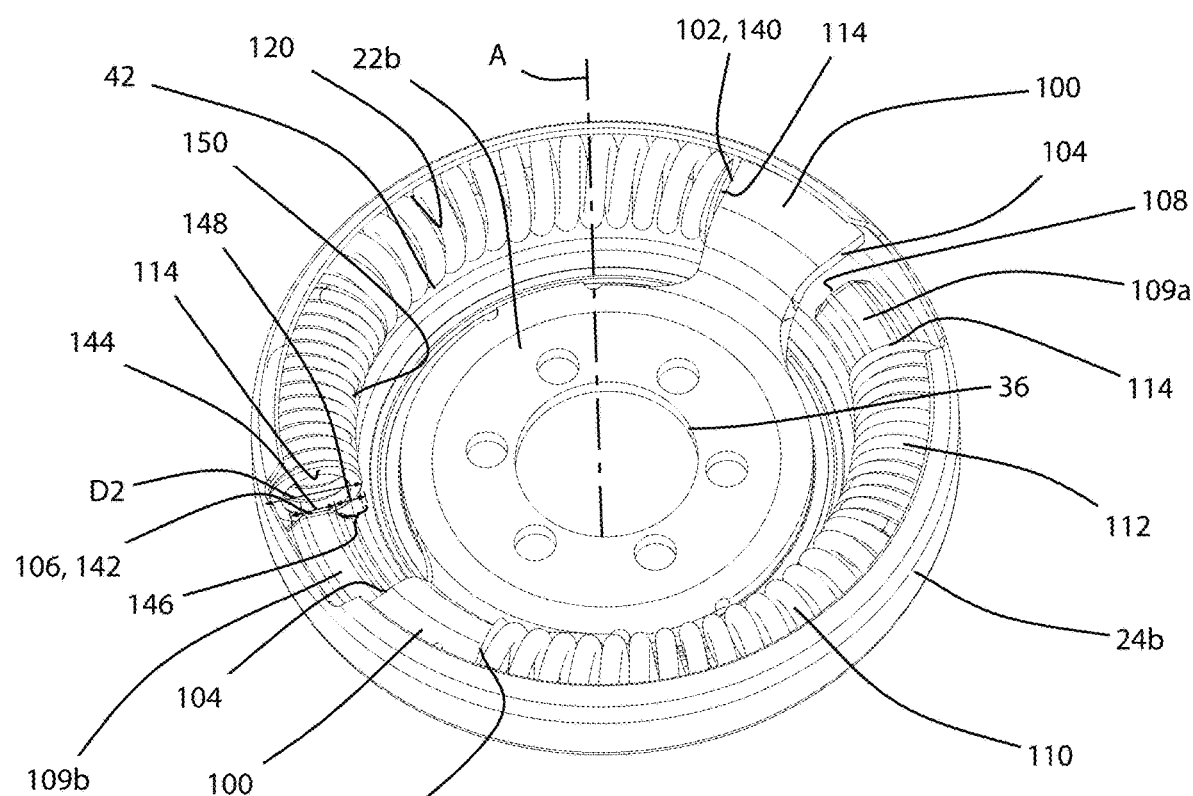
FIG. 6 is a perspective view of a portion of the isolation device shown in FIG. 1, showing torque transfer from a hub of the isolation device to a pulley of the isolation device.

As can be seen based on FIGS. 6 and 12, the second spring drive surface 142 extends across a first portion 144 of the diameter D2 of the second isolation spring 112 such that there is a space 146 adjacent the second spring drive surface 142 towards the isolation device axis A. The space 146 extends across a second portion 148 of the diameter D2 of the second isolation spring 112, from a side edge of the second spring drive surface 142 to a radially inner side 150 of the second isolator spring 112 relative to the isolation device axis A.

Figure 10A:
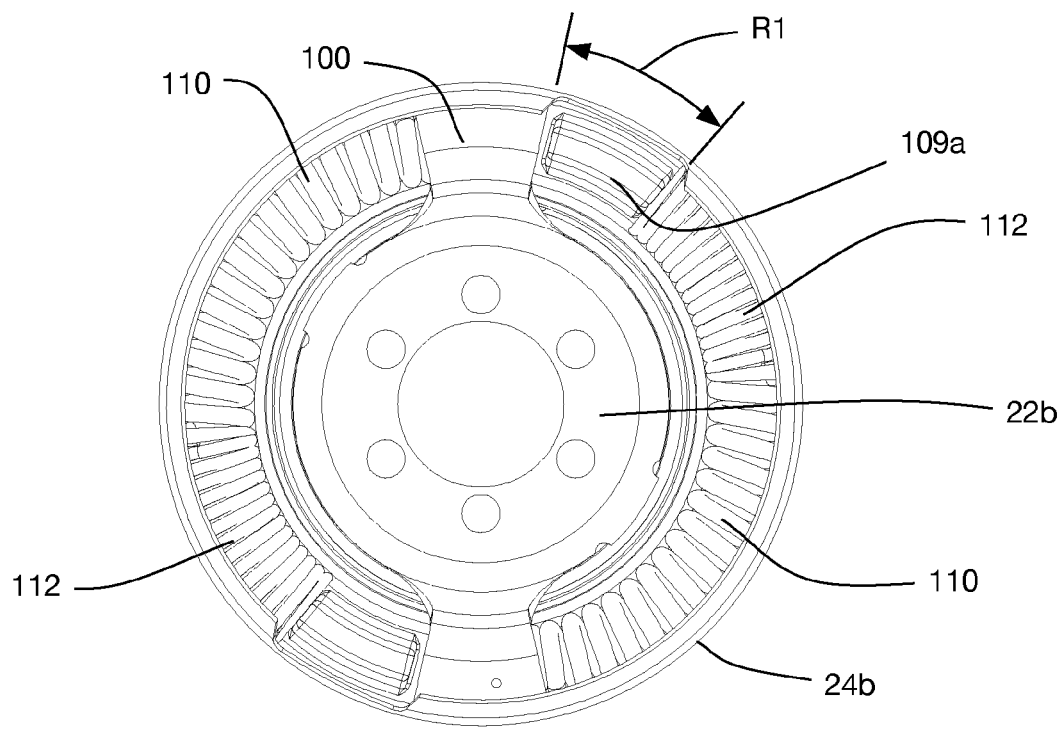
FIG. 10A is a plan view of the portion of the isolation device shown in FIG. 6, showing a first range of movement available during torque transfer from the hub to the pulley.
Figure 10B:
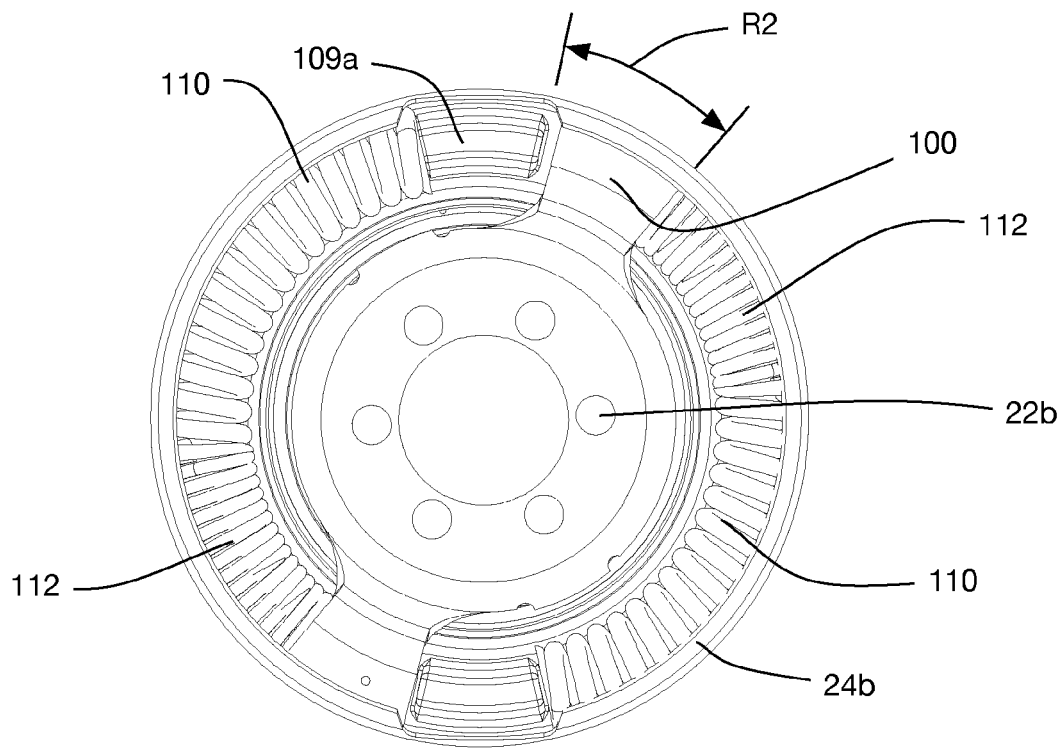
FIG. 10B is a plan view of the portion of the isolation device shown in FIG. 7, showing a second range of movement available during torque transfer from the pulley to the hub.

As can be seen from FIGS. 10A and 10B, during torque transfer from the first one of the hub 22 and the pulley 24 to the second one of the hub 22 and the pulley 24, the isolation spring arrangements 28 permit relative movement between the hub 22 and the pulley 24 through a first range of angular movement (R1 shown in FIG. 10A), and wherein, during torque transfer from the second one of the hub 22 and the pulley 24 to the first one of the hub 22 and the pulley 24, the isolation spring arrangements permit relative movement between the hub 22 and the pulley 24 through a second range of angular movement R2 shown in FIG. 10B.

The second spring rate K2 and the size of the space 146 are selected such that, at a selected torque transfer level TS3 during torque transfer between the hub 22 and the pulley 24 through the first and second isolation springs 110 and 112, the selected torque transfer level TS3 drives the coils 118 of the second isolation spring 112 to contact one another on the radially inner side 150 of the second isolation spring 112 relative to the isolation device axis A, and to drive at least one of the coils 118 at the first end 114 of the second isolation spring 112 to tip into the space 146, which in turn permits the first range of angular movement to exceed the second range of angular movement.

The reason for this is that the first spring rate K1 of the first isolation spring 110 is relatively high. As a result, there is no tendency for the first isolation spring 110 to tip into the space 146 in order to extend the range of movement available, when the first spring drive surface 140 is one of the pulley/spring interface surfaces 106 and 108. This extension of the first range of movement relative to the second range of movement is advantageous in certain scenarios. For example, when the engine undergoes a key start, it is beneficial to provide as much range of movement as possible in order to prevent lock up of the isolation device 20. However, by contrast, during an MGU start, it is sometimes considered advantageous to have a shorter range of movement prior to lock up of the isolation device, in order to provide high torque to the crankshaft 12 relatively quickly.

The space 146 may extend across any suitable amount of the diameter of the second isolation spring 112. In an embodiment, the space 146 may extend across at least 30% of the diameter of the second isolation spring 112. In an embodiment, the space 146 may extend across at least one third of the diameter of the second isolation spring 112.

It will be noted that the first and second isolation springs shown in the embodiment shown in FIGS. 3-12 are coiled oppositely to one another. As a result, when torque is transferred through their respective second ends 116 to one another, there is no likelihood of the first and second isolation springs 110 and 112 entangling. By contrast, this would be possible if the first and second isolation springs 110 and 112 were coiled the same way (e.g. both right handed, or left handed coiling).

Reference is made to FIG. 13, which shows an optional feature on the second isolation spring 112. In order to reduce stresses on the coils 118 and slippage between the coils 118 of the isolation spring 112 when the torque applied through the isolation spring arrangement 28 is such that the coils 118 of the second isolation spring 112 contact one another, the mating surfaces shown at 180 of the coils 118 (i.e. also referred to as the intra-coil surfaces 180, are flattened prior to formation of the stock wire into the second isolation spring 112.

Reference is made to FIG. 14, which shows a variant of the isolation device 20, in which each isolation spring arrangement 28 includes the first isolation spring 110, the second isolation spring 112 and a third isolation spring 182 that is in series with the first and second isolation springs 110 and 112. In the embodiment shown, the third isolation spring 182 has a third spring rate K3 that is higher than the second spring rate K2, and which may be higher or lower than the first spring rate K1. The advantages above regarding the increased amount of damping torque, the shift in the torque at which the isolation device enters into the second range of torque transfer and the increased range of movement during torque transfer are all present in this variant.

Figure 15:
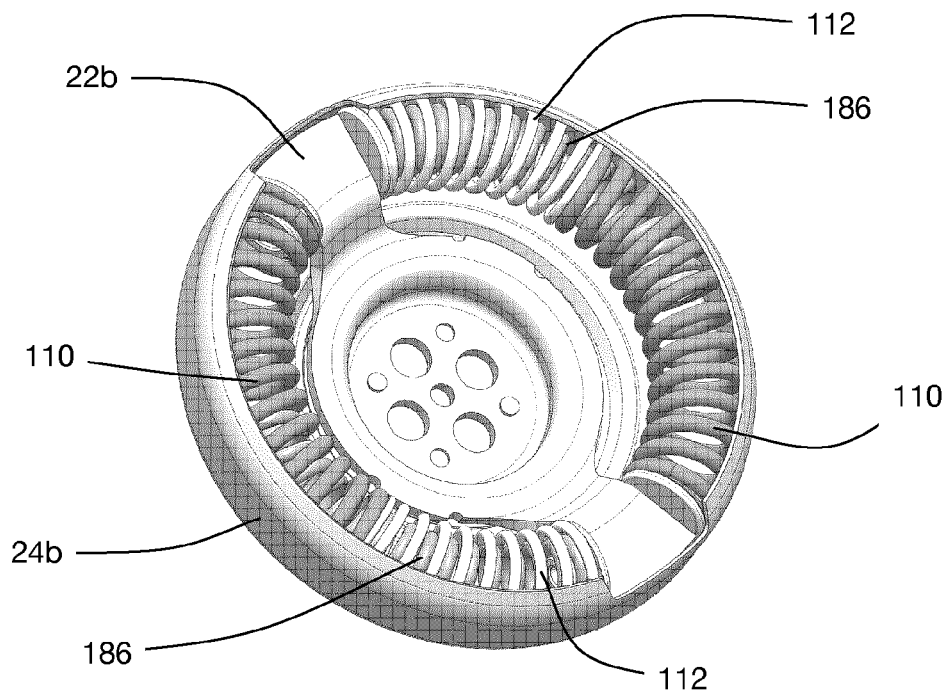
FIG. 15 is a perspective view of another variant of the isolation device shown in FIG. 2, where each isolation spring arrangement includes first, second and third isolation springs where two of the springs are in series and a third spring is in parallel with the two springs in series.

Reference is made to FIG. 15, which shows another variant of the isolation device 20, in which each isolation spring arrangement 28 includes the first isolation spring 110, the second isolation spring 112 and a third isolation spring 186 that is in parallel with the first and second isolation springs 110 and 112. In the embodiment shown, the third isolation spring 182 has a third spring rate K3 that is higher than the second spring rate K2, and which may be higher or lower than the first spring rate K1. The advantages above regarding the increased amount of damping torque, the shift in the torque at which the isolation device enters into the second range of torque transfer and the increased range of movement during torque transfer are all present in this variant.

Figure 16:
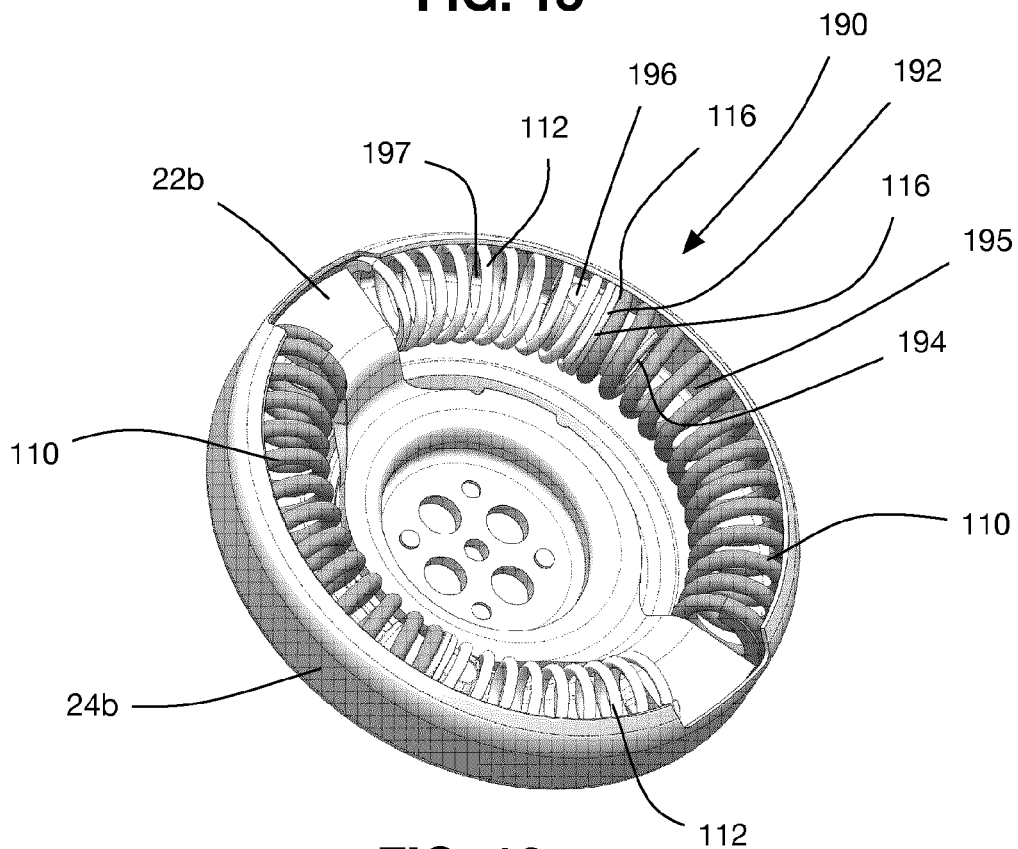
FIG. 16 is a perspective view of yet another variant of the isolation device shown in FIG. 2, including a connector that connects the isolation springs that make up the isolation spring arrangement.

A variant of the isolation device 20 is shown in FIG. 16. As can be seen, a connector 190 is provided, which holds the second ends 116 of the first and second isolation springs 110 and 112. The connector includes a plate 192 that engages the second ends 116 of the first and second isolation springs 110 and 112, a first projection 194 extending from the plate 192 into the first isolation spring 110 (i.e. into a hollow 195 in the first isolation spring 110), and a second projection 196 extending from the plate 192 into the second isolation spring 112 (i.e. into a hollow 197 in the second isolation spring 112. The plate 192 and projections 194 and 196 maintain the second ends 116 of the first and second isolation springs 110 and 112 parallel with one another, so as to maintain torque transfer across an entirety of the second ends 116 between the first and second isolation springs 110 and 112.

It will be noted that, while the embodiments herein show the isolation device 20 on the crankshaft 12 it is alternatively possible to provide the isolation device 20 on the shaft of the MGU 16a or any other suitable accessory. In such embodiments, the arrangement of the first and second isolation springs 110 and 112 may need to be reversed, depending on when the application calls for higher friction, longer travel and any of the other features described herein.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. An isolation device, comprising:
a hub that is mountable to a shaft;
a pulley that is rotatably mounted to the hub, wherein the pulley has a belt engagement surface that is positioned to engage an engine accessory drive belt for torque transfer therewith; and
at least one isolation spring arrangement that includes a first isolation spring and a second isolation spring, wherein each of the first and second isolation springs is a helical compression spring having a length, wherein the first isolation spring has a first spring rate, and wherein the second isolation spring has a second spring rate and is positioned in series with the first isolation spring, wherein the first spring rate is higher than the second spring rate, wherein the first and second isolation springs are arranged such that the first isolation spring transfers torque from the second isolation spring into a first one of the hub and the pulley and the second isolation spring transfers torque from the first isolation spring into a second one of the hub and the pulley,
wherein, initially during torque transfer from the first one of the hub and the pulley to the second one of the hub and the pulley, the entire first isolation spring is slid along a friction surface towards the second one of the hub and the pulley by the first one of the hub and the pulley during compression of the second isolation spring, thereby generating a first frictional damping torque, and
wherein, initially during torque transfer from the second one of the hub and the pulley to the first one of the hub and the pulley, at least a portion of the first isolation spring remains stationary relative to the friction surface and the entire second isolation spring is slid along the friction surface, during compression of the first isolation spring by the second one of the hub and the pulley, thereby generating a second frictional damping torque, and
wherein the first and second spring rates and the lengths of the first and second isolation springs are selected such that the first frictional damping torque is greater than the second frictional damping torque.

2. An isolation device as claimed in claim 1, wherein the first and second isolation springs directly abut one another.

3. An isolation device as claimed in claim 1, wherein the first isolation spring directly abuts the first one of the hub and the pulley and the second isolation spring directly abuts the second one of the hub and the pulley.

4. An isolation device as claimed in claim 1, wherein the first one of the hub and the pulley is the hub and the second one of the hub and the pulley is the pulley.

5. An isolation device as claimed in claim 1, wherein the first one of the hub and the pulley is the pulley and the second one of the hub and the pulley is the hub.

6. An isolation device as claimed in claim 1, wherein each of the at least one isolation spring arrangement further includes a third isolation spring that acts in series with the first and second isolation springs.

7. An isolation device as claimed in claim 1, wherein each of the at least one isolation spring arrangement further includes a third isolation spring that acts in parallel with the first and second isolation springs.

8. An isolation device as claimed in claim 1, wherein a transfer member connector is positioned between the first and second isolation springs such that the first and second isolation springs both directly abut the connector.

9. An isolation device as claimed in claim 1, wherein the friction surface is provided on a spring shell that is included with the pulley and at least partially envelops the first and second isolation springs.

10. An isolation device as claimed in claim 9, wherein the first and second isolation springs extend along an arcuate path inside the spring shell about an isolation device axis, and wherein the friction surface is a surface of the spring shell that engages a radially outer surface of the first isolation spring, wherein the radially outer surface of the first isolation spring is radially outward in relation to the isolation device axis.

11. An isolation device as claimed in claim 1, further comprising a connector that holds the second ends of the first and second isolation springs, wherein the connector includes a plate that engages the second ends of the first and second isolation springs, a first projection extending from the plate into the first isolation spring, and a second projection extending from the plate into the second isolation spring, wherein the plate and the projections maintain the second ends of the first and second isolation springs parallel with one another, so as to maintain torque transfer across an entirety of the second ends between the first and second isolation springs.

12. An isolation device as claimed in claim 1, wherein each of the first and second isolation springs is a helical compression spring having a first end, a second end, and a plurality of coils between the first and second ends, wherein the first ends of the first and second isolation springs face away from one another, and the second ends of the first and second isolation springs face one another, wherein the first and second isolation springs each have a diameter, and extend along an arcuate path inside the pulley about an isolation device axis, wherein a first spring drive surface on the first one of the hub and the pulley engages the first end of the first isolation spring, and a second spring drive surface on the second one of the hub and the pulley engages the first end of the second isolation spring, wherein the second spring drive surface extends across a first portion of the diameter of the second isolation spring such that there is a space adjacent the second spring drive surface towards the isolation device axis, wherein the space extends across a second portion of the diameter of the second isolation spring, from a side edge of the second spring drive surface to a radially inner edge of the second isolator spring relative to the isolation device axis, wherein, during torque transfer from the first one of the hub and the pulley to the second one of the hub and the pulley, the at least one isolation spring arrangement permits relative movement between the hub and the pulley through a first range of angular movement, and wherein, during torque transfer from the second one of the hub and the pulley to the first one of the hub and the pulley, the at least one isolation spring arrangement permits relative movement between the hub and the pulley through a second range of angular movement, wherein, the second spring rate and a size of the space are selected such that, at a selected torque transfer level during torque transfer between the hub and the pulley through the first and second isolation springs, the selected torque transfer level drives the coils of the second isolation spring to contact one another on a radially inner side of the second isolation spring relative to the isolation device axis, which in turn drives at least one of the coils at a free end of the second isolation spring to tip into the space, which in turn permits the first range of angular movement to exceed the second range of angular movement.

13. An isolation device as claimed in claim 1, wherein the second isolation spring includes a plurality of coils, wherein the coils have intra-coil surfaces that are flat and that are matable with one another when torque transfer through the isolation device is at a selected torque transfer level.

14. An isolation device, comprising:
a hub that is mountable to a shaft;
a pulley that is rotatably mounted to the hub; and
at least one isolation spring arrangement that includes a first isolation spring and a second isolation spring, wherein each of the first and second isolation springs is a helical compression spring having a first end, a second end, and a plurality of coils between the first and second ends, wherein the first ends of the first and second isolation springs face away from one another, and the second ends of the first and second isolation springs face one another, wherein the first and second isolation springs each have a diameter, and extend along an arcuate path inside the pulley about an isolation device axis, wherein the first isolation spring has a first spring rate, and wherein the second isolation has a second spring rate and is positioned in series with the first isolation spring, wherein the first spring rate is higher than the second spring rate, wherein the first and second isolation springs are arranged such that the first isolation spring transfers torque from the second isolation spring into a first one of the hub and the pulley and the second isolation spring transfers torque from the first isolation spring into a second one of the hub and the pulley, wherein a first spring drive surface on the first one of the hub and the pulley engages the first end of the first isolation spring, and a second spring drive surface on the second one of the hub and the pulley engages the first end of the second isolation spring, wherein the second spring drive surface extends across a first portion of the diameter of the second isolation spring such that there is a space adjacent the second spring drive surface towards the isolation device axis, wherein the space extends across a second portion of the diameter of the second isolation spring, from a side edge of the second spring drive surface to a radially inner edge of the second isolator spring relative to the isolation device axis,
wherein, during torque transfer from the first one of the hub and the pulley to the second one of the hub and the pulley, the at least one isolation spring arrangement permits relative movement between the hub and the pulley through a first range of angular movement, and wherein, during torque transfer from the second one of the hub and the pulley to the first one of the hub and the pulley, the at least one isolation spring arrangement permits relative movement between the hub and the pulley through a second range of angular movement,
wherein, the second spring rate and a size of the space are selected such that, at a selected torque transfer level during torque transfer between the hub and the pulley through the first and second isolation springs, the selected torque transfer level drives the coils of the second isolation spring to contact one another on a radially inner side of the second isolation spring relative to the isolation device axis, which in turn drives at least one of the coils at a free end of the second isolation spring to tip into the space, which in turn permits the first range of angular movement to exceed the second range of angular movement.

15. An isolation device as claimed in claim 14, wherein the space extends across at least 30% of the diameter of the second isolation spring.

16. An isolation device as claimed in claim 14, wherein the space extends across at least one third of the diameter of the second isolation spring.

17. An isolation device as claimed in claim 14, wherein the first one of the hub and the pulley is the hub, and the second one of the hub and the pulley is the pulley.

18. An isolation device as claimed in claim 14, further comprising a connector that holds the second ends of the first and second isolation springs, wherein the connector includes a plate that engages the second ends of the first and second isolation springs, a first projection extending from the plate into the first isolation spring, and a second projection extending from the plate into the second isolation spring, wherein the plate and the projections maintain the second ends of the first and second isolation springs parallel with one another, so as to maintain torque transfer across an entirety of the second ends between the first and second isolation springs.

19. An isolation device as claimed in claim 14, wherein each of the at least one isolation spring arrangement further includes a third isolation spring that acts in series with the first and second isolation springs and is positioned between the first and second isolation springs.

20. An isolation device as claimed in claim 14, wherein the plurality of coils of the second isolation spring has intra-coil surfaces that are flat and that are matable with one another when torque transfer through the isolation device is at the selected torque transfer level.

* * * * *